United States Patent
Coleman et al.

[11] Patent Number: 5,831,401
[45] Date of Patent: Nov. 3, 1998

[54] IMPEDANCE CONTROLLER

[76] Inventors: Ronald B. Coleman; Alan R. D. Curtis; Paul J. Remington, all of c/o BBN Corporation 150 CambridgePark Dr., Cambridge, Mass. 02140

[21] Appl. No.: 823,867

[22] Filed: Mar. 25, 1997

[51] Int. Cl.$^6$ .................... H02K 33/00; G05D 19/02
[52] U.S. Cl. .................... 318/114; 318/611; 318/676
[58] Field of Search .................... 318/114, 561, 318/566, 611, 623, 628, 648, 671, 676, 460

[56] References Cited

U.S. PATENT DOCUMENTS 4,715,559  12/1987  Fuller .
5,367,612  11/1994  Bozich et al. .
5,526,292   6/1996  Hodgson et al. .

*Primary Examiner*—Bentsu Ro
*Attorney, Agent, or Firm*—FLoyd E. Anderson; Leonard C. Suchyta

[57] ABSTRACT

The system disclosed herein controls the vibratory energy radiated from a structure subject to excitation from an outside disturbance by enforcing a preselected mechanical impedance upon at least one point in the structure using an electromechanical transducer connected to the structure at that point. The transducer is energized in response to the output of an adjustable or adaptable filter. Sensors provide signals representing the force applied by the transducer and the resultant velocity. The force and velocity signals are applied as inputs to the adaptable filter through circuit means including a component providing an electrical analog of the preselected mechanical impedance. The adaptable filter is then controlled to reduce the amplitude of the input signal applied to the filter, i.e. the error between the measured mechanical impedance and the desired impedance.

4 Claims, 2 Drawing Sheets

IMPEDANCE CONTROLLER

RELATED APPLICATION

The present application claims the benefit of U.S. Provisional Application No. 60/014,207, filed Mar. 27, 1996.

BACKGROUND OF THE INVENTION

The present invention relates to active noise and vibration control and more particularly to a system for controlling the vibratory energy radiated from a structure subject to external excitation.

As is understood by those skilled in the art, a variety of schemes have been developed or proposed for actively controlling noise and vibration. One of the most common is the so-called acoustical virtual earth in which the control objective is to minimize the sound pressure at a single location, i.e. the location of an error signal sensing microphone. Control is implemented by a feedback circuit that couples the microphone output to the voltage input to a loudspeaker through an adaptable filter. The control system is then designed to give optimum noise reduction (disturbance rejection in control terms) over a large bandwith while maintaining robust stability. This scheme may not provide the best effective impedance for global sound reduction as opposed to merely reduction at the sensed location.

Another type of local feedback control is characterized as providing an absorbing termination. This is usually implemented by measuring both sound pressure and acoustic particle velocity and adjusting the controlled source response so as to bring the two quantities in phase so as to implement an energy absorption device. This control is complicated to implement because at least two microphones are required to measure the acoustic particle velocity.

Broadband feedforward noise control systems have also been proposed but they have typically been too complicated or too expensive to have gone beyond laboratory stage, the exception being for one dimensional propagation in ducts.

One class of noise control problem which is of interest is the control of vibratory energy radiated from a structure subject to external excitation. One example of such a problem is the radiation of sound by a fuselage panel into the interior of an aircraft due to turbulent boundary layer excitation.

SUMMARY OF THE INVENTION

In accordance with one aspect of the present invention, vibratory energy radiated from a structure is controlled by actively enforcing a preselected mechanical impedance upon at least one point in the structure. The impedance is enforced by an actuator or electromechanical transducer, the output of which is connected to the structure at the selected point. The transducer is driven in response to the output from an adjustable or adaptable filter. Sensors provide first and second signals representing, respectively, the force applied by the transducer to the attachment point and the resultant velocity. Circuitry including a component providing an electrical analog of the preselected mechanical impedance is employed for coupling the first and second signals to the input of the adaptable filter, the component being interposed in the path of at least one of the first and second signals. A controller, then adjusts the adaptable filter so as to reduce the amplitude of the input signal, i.e. the "residual" signal, applied to the adaptive filter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
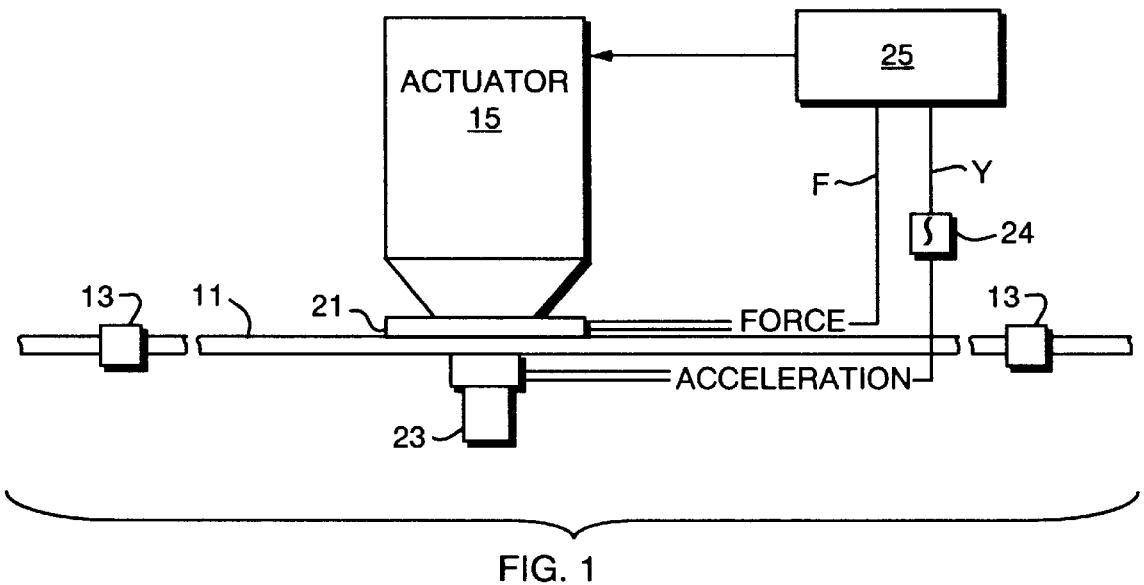
FIG. 1 illustrates a panel structure to which an impedance control system according to the present invention has been applied.

Referring now to FIG. 1, reference character 11 indicates a panel supported within a frame 13. In accordance with the exemplary problem described previously, this panel 11 may be considered to be a portion of an aircraft subject to turbulent boundary layer excitation.

As indicated previously, the system of the present invention operates by actively enforcing a preselected mechanical impedance upon at least one point in the structure whose behavior is to be modified. The application of forces to enforce the preselected impedance is accomplished by means of an electromagnetic transducer or actuator 15. The actuator 15 will typically include an output element which is connected to the structure at the selected point. The actuator will thus apply, to the selected point, a force which varies in response to the level of energization of the actuator, with the actuator typically working against its own inertial mass. Depending upon the particular vibration problem, the actuator 15 may be constituted by a so-called voice coil actuator or a magnetic shaker.

A force sensor 21 is provided for generating a signal representing the force applied by the actuator to the selected point and an accelerometer 23 is provided to allow the generation, by integration as indicated at reference character 24, of a signal representing the velocity of the attachment point. The level of energization of actuator 15 is adjusted by driver circuitry indicated generally by reference character 25.

Figure 2:
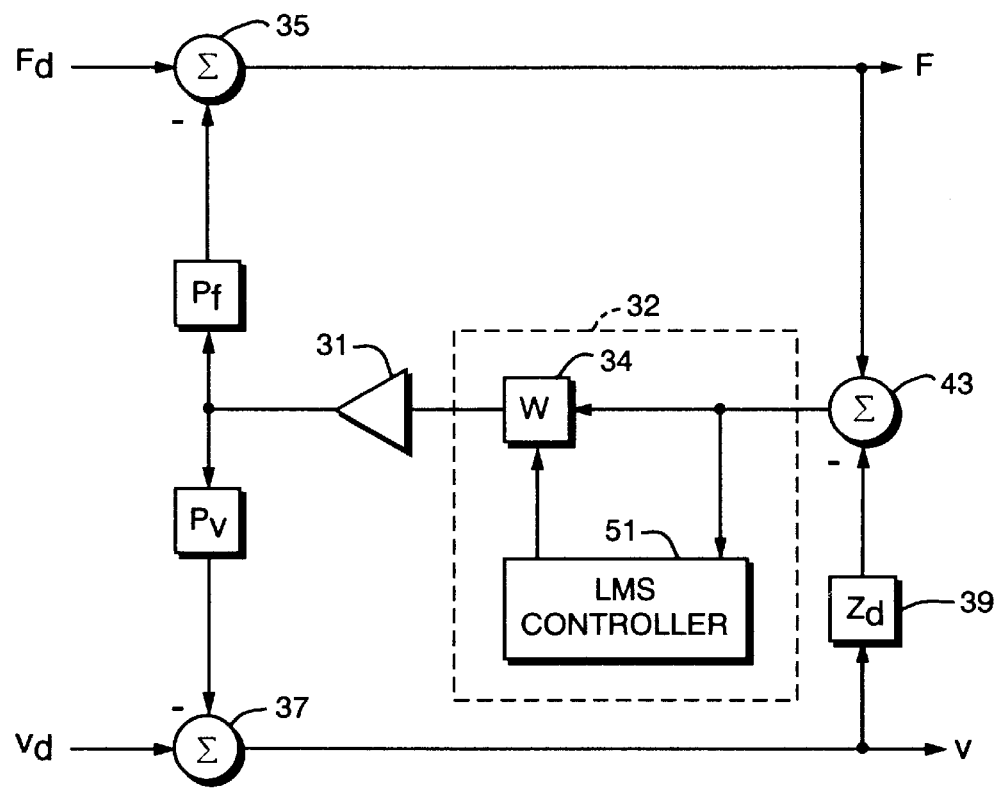
FIG. 2 is a block diagram illustrating the general arrangement of the control system employed in the system of FIG. 1.

Referring now to FIG. 2, the signals $F_d$ and $V_d$ are the uncontrolled outputs of the force and velocity sensors, i.e. the signals which would be produced by the external disturbance with any active control turned off. As indicated previously, the actuator 15 is driven by the output signal from an adaptive filter applied through a power amplifier 31. In FIG. 2, the overall adaptive filter circuitry is designated by reference character 32, though a breakdown into component elements or subsystems is described in greater detail hereinafter. The adaptive filter includes an adjustable or adaptable filter 34 and adaptation control circuitry or controller 51 for adjusting the parameters of the filter 34. The control filter function itself is designated as "W".

The transfer functions relating the outputs of the force sensor and the velocity sensor to the amplified output of the control filter are designated as $P_f$ and $P_v$ in FIG. 2. These transfer functions include the characteristics of the actuator as well as those of the sensors. By virtue of the physical coupling of the actuator to the panel, the active and uncontrolled forces and velocity components are effectively summed as indicated at reference characters 35 and 37, with the combined output of the force and velocity sensors being designated as "F" and "v" respectively.

An electrical analog of the desired mechanical impedance to be imposed on the structure is represented as $Z_d$ and this component or function is applied to the velocity signal, as indicated at reference character 39, before being electrically combined with the force signal, as indicated at reference character 43. The summed signal is then applied to the adaptive filter 32.

The filter 34 is adjusted by means of a conventional LMS (least means squares) controller 51 so as to minimize the amplitude of the input signal to the adaptable filter. Other adaptation schemes are also possible. The input signal to the adaptable filter may be considered to be a "residual" signal in accordance with conventional terminology in the art. To the extent the controller 51 is successful in minimizing the input signal to the adaptable filter 34, the desired mechanical impedance will be enforced on the structure at the point of attachment of the actuator 15.

While the adjustable or adaptable filter 34 could be implemented in various ways, a preferred implementation and analysis supporting that implementation are described as follows:

It is possible to reformulate the adaptive filter problem using the Youla transform so that the coefficients in the feedback controller can be calculated easily. This requires that the control filter be composed of a FIR (finite impulse response) filter with a feedback loop around it as shown in FIG. 3.

Figure 3:
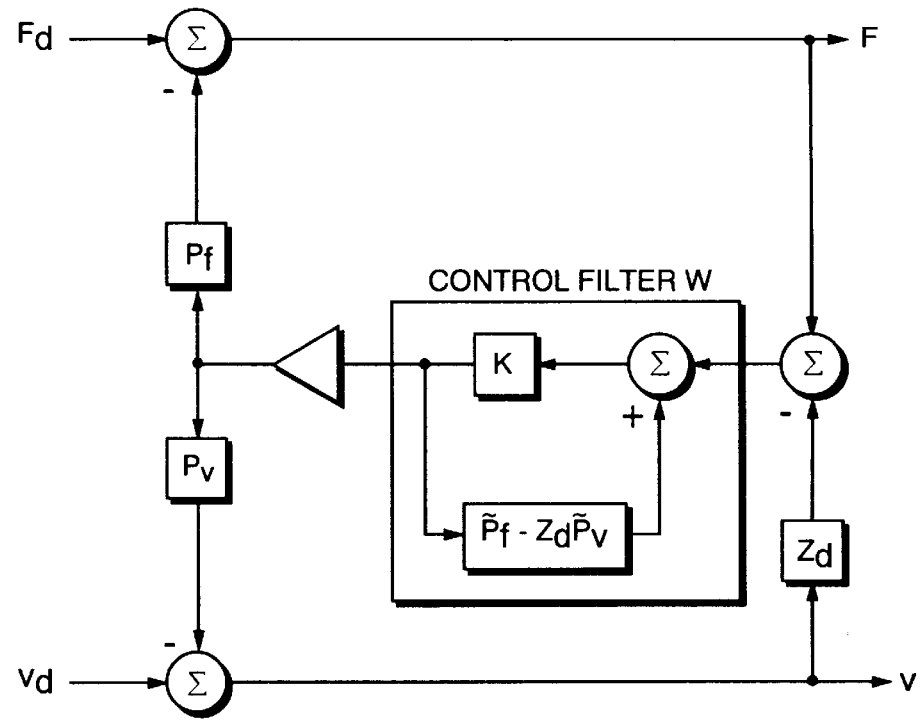
FIG. 3 is a block diagram illustrating in more detail an implementation of the control system.

In FIG. 3, the filter K is a FIR filter whose coefficients are to be determined and adjusted by the controller so as to minimize the residual given by $F-Z_d V$. The transfer function in the feedback loop around K is an estimate of the plant transfer function based on an estimate of $P_f$, $P_v$ and the desired impedance $Z_d$. The fact that the transfer functions in the controller are estimates is indicated the by the tilda (~) over the transfer function symbol.

Referring back to FIG. 2 we can express the two outputs (v, F) in terms of the two inputs as $$v = \{1 + (P_f - Z_d P_v)W\}^{-1}\{-P_v W F_d + (1 + P_f W)v_d\} \quad (1)$$

$$F = \{1 + (P_f - Z_d P_v)W\}^{-1}\{(1 - P_v W Z_d)F_d + P_f W Z_d v_d\}$$

In FIG. 2 the control filter W can be written in terms of K as $$W = \frac{K}{1 - (\tilde{P}_f - Z_d \tilde{P}_v)K} \quad (2)$$

Substituting Eq. 2 into Eq. 1 we obtain $$v = \{1 + [(P_f - Z_d P_v) - (\tilde{P}_f - Z_d \tilde{P}_v)]K\}^{-1}\{-P_v K F_d + [1 + (P_f - \tilde{P}_f)K + \tilde{P}_v Z_d K]v_d\} \quad (3)$$

$$F = \{1 + \{(P_f - Z_d P_v) - (\tilde{P}_f - Z_d \tilde{P}_v)\}K\}^{-1}\{[1 - (P_v Z_d - \tilde{P}_v Z_d)K - \tilde{P}_f K]F_d + P_f Z_d K v_d\}$$

If $\tilde{P}_f$ and $\tilde{P}_v$ are good estimates of the plant transfer functions then these equations simplify to $$v = \{-P_v K F_d 34 [1 + \tilde{P}_v Z_d K] v_d\} \quad (4)$$

$$F = \{[1 - \tilde{P}_f K]F_d + P_f Z_d K v_d\}$$

Figure 4:
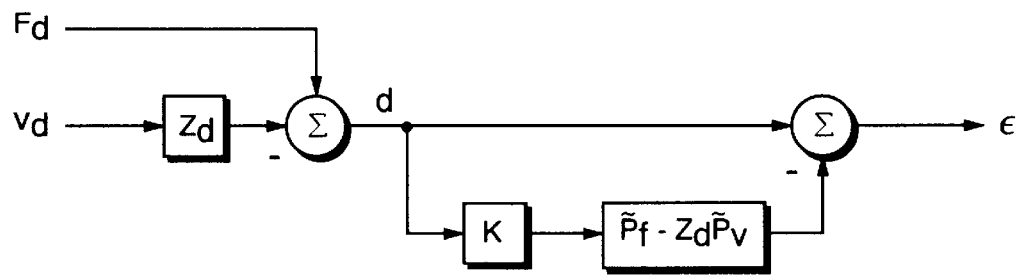
FIG. 4 is a block diagram providing an alternate illustration of control circuitry implementation.

Combining these two equations to obtain the desired residual, we obtain $$\epsilon = F - Z_d v = \{1 - (P_f - Z_d P_v)K\}\{F_d - Z_d v_d\} \quad (5)$$

which can be represented by the feed forward system block diagram in FIG. 4.

The advantage of this formulation is that the coefficients in the FIR filter representation of the control filter K can be estimated quite easily using standard least mean square (LMS) techniques. For example, the residual, $\epsilon$, at time step n can be expressed as $$\epsilon(n) = d(n) - \sum_{m=0}^{M} \sum_{j=0}^{J} k(m)p(j)d(n-m-j) \quad (6)$$

where d is the disturbance given by $\{F_d - Z_d V_d\}$, k(m) is the impulse response of the control filter (k(m) is the magnitude of the coefficient of tap m), p(j) is the impulse response of the plant, $P_f - Z_d P_v$, M is the number of control filter taps and J is the number of taps in the representation of the plant. If we square both sides of Eq. 6 and take the expected value we obtain $$E\{\epsilon^2(n)\} = E\{d^2(n)\} - 2\sum_{m=0}^{M}\sum_{j=0}^{J} k(m)p(j)R_d(m+j) + \quad (7)$$

$$\sum_{m=0}^{M}\sum_{j=0}^{J}\sum_{k=0}^{M}\sum_{l=0}^{J} k(m)k(k)p(j)p(l)R_d(k+l-[m+j])$$

where the autocorrelation of the disturbance $R_d$ is given by $$R_d(r) = \frac{1}{N-J-M} \sum_{n=J+M}^{N} d(n)d(n-r)$$

and the number of time samples is N. Differentiating Eq. 7 By $\delta/\delta k(r)$. we obtain one equation for each control filter coefficient $$2\sum_{j=0}^{J} p(j)R_d(r+j) =$$

$$\sum_{m=0}^{M} k(m) \sum_{j=0}^{J}\sum_{l=0}^{J} p(j)p(l)\{R_d(m+l-r-j) + R_d(r+l-m-j)\}$$

The resulting system of M equations can be written in matrix form as $$\bar{b} = [A]\bar{k} \quad (8)$$

where $\bar{k}$ is the vector of filter coefficients and [A] is a matrix with elements given by $$a_{rm} = \sum_{j=0}^{J}\sum_{l=0}^{J} p(j)p(l)\{R_d(m+l-r-j) + R_d(r+l-m-j)\}$$

and the elements of the vector $\bar{b}$ are given by $$b_r = 2\sum_{j=0}^{J} p(j)R_d(r+j)$$

Figure 5:
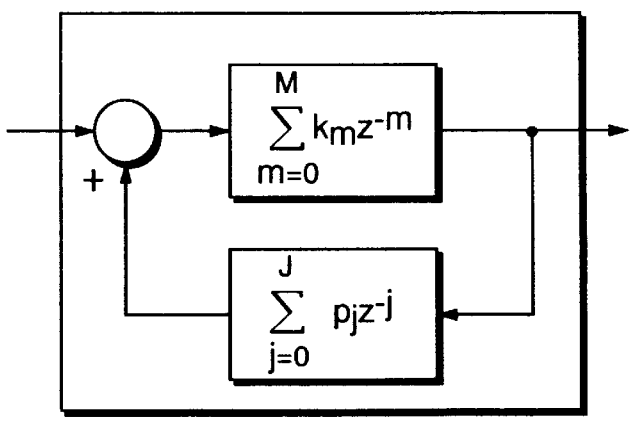
FIG. 5 is a block diagram illustrating a preferred implementation of the control system employed in the system of FIG. 1.

The solution of Eq. 8 yields the vector of coefficients of the FIR filter, K, $$\bar{k} = [A]^{-1}\bar{b}$$

and this result substituted into the definition of the control filter W results in a FIR filter with a feedback loop around it. In the feedback loop is the plant model which in turn would be approximated by a FIR filter as shown in FIG. 5.

As indicated earlier, a principal aspect of the present invention is that the local feedback control loop operates to impose or enforce a preselected mechanical impedance on a selected point in the structure. In other words, the local feedback control system is handed a value or parameter which in effect instructs it to maintain a corresponding mechanical impedance value at the selected point in the structure. It should be understood, however, that the impedance value may itself be varied from time to time in accordance with some larger or overall control algorithm, e.g. an algorithm which seeks to minimize total cabin noise in an aircraft. Such an overall or global control system may, for example, supervise a large number of individual impedance control systems of the type described herein. A principal advantage of local control implementation through impedance control, however, is that each local adaptive loop is essentially a SISO (single input/single output) controller so that implementation and stability constraints are greatly simplifiled and the adaptable filter can be straightforwardly implemented as a conventional FIR (finite impulse response) filter for which LMS controllers are well developed.

In the embodiment illustrated, the signals into and out of the adapting filter 32 may, in one sense, be thought of as analogs of force. However, as will be understood by those skilled in the art, an equivalent arrangement would be to process signals which are velocity analogs. In this case, a circuit component representing the complement of impedance ($1/Z_d$) would be inserted into the path of the force signal. This component could also be represented as a compliance vector.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for controlling the vibratory energy radiated from a structure subject to excitation from a disturbance by enforcing a preselected impedance upon at least one point in the structure, said apparatus comprising:

an electromechanical transducer;

means for connecting the mechanical output of said transducer to said structure at said one point;

a first sensor providing a first signal representing the force applied by said transducer to said point;

a second sensor providing a second signal representing the velocity of said point;

a control filter;

an amplifier for energizing said transducer in response to the output signal from said control filter;

circuit means including a component providing an electrical analog of said preselected impedance for coupling said first and second signals to the input of said control filter, said component being interposed in the path of one of said first and second signals; and a controller for adjusting said control filter to reduce the amplitude of the input signal to said control filter.

2. Apparatus as set forth in claim 1 wherein said control filter is a first finite impulse response filter and said controller is a least means squares controller which adjusts the coefficients of said control filter.

3. Apparatus as set forth in claim 2 further comprising a feedback path around said first finite impulse response filter, said feedback path including a second finite impulse response filter which models the plant impulse response.

4. Apparatus for controlling the vibratory energy radiated from a structure subject to excitation from a disturbance, said apparatus comprising:

an electromechanical transducer;

means for connecting the mechanical output of said transducer to said structure at a preselected point;

a first sensor providing a first signal representing the force applied by said transducer to said point;

a second sensor providing a second signal representing the velocity of said point;

an adjustable finite impulse response control filter;

an amplifier for energizing said transducer in response to the output signal from said control filter;

circuit means including a component providing an electrical analog of a preselected mechanical impedance for coupling said first and second signals to the input of said control filter, said component being interposed in the path of at least one of said first and second signals; and a least means squares controller for adjusting the parameters of said control filter to reduce the amplitude of the input signal to said control filter and thereby enforce a preselected mechanical impedance upon said point in the structure.

* * * * *

UNITED STATES PATENT AND TRADEMARK OFFICE
CERTIFICATE OF CORRECTION

PATENT NO.  : 5,831,401
DATED       : 11/3/98
INVENTOR(S) : Ronald B. Coleman, Alan R.D. Curtis, and Paul J. Remington It is certified that error appears in the above-identified patent and that said Letters Patent is hereby corrected as shown below:

On the title page, insert the following:

[73]  Assignee: BBN CORPORATION
                      Cambridge, Massachusetts

Signed and Sealed this

Twenty-eighth Day of September, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.    : 5,831,401
DATED         : November 3, 1998
INVENTOR(S)   : Coleman et al.

It is certified that error appears in the above-identified patent and that said Letters Patent is hereby corrected as shown below:

Title page,
Insert Item -- [62], Related U.S. Application Data, Provisional Application No. 60/014,207, filed March 27, 1996 --

Signed and Sealed this

Seventeenth Day of August, 2004

JON W. DUDAS
*Acting Director of the United States Patent and Trademark Office*